Figure 1:
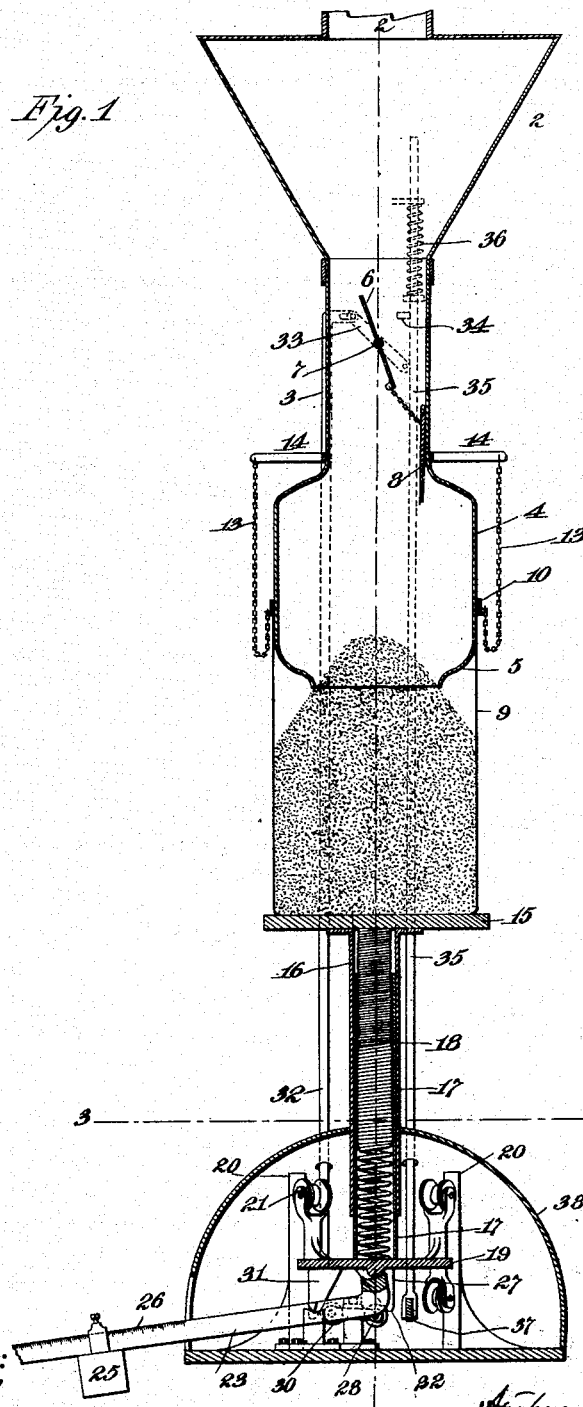

No. 676,100. Patented June 11, 1901.
A. & L. SMITH.
BAG FILLING AND WEIGHING MACHINE.
(Application filed June 28, 1900.)
(No Model.) 3 Sheets—Sheet 1.

Witnesses: Inventors
Arthur Smith & Luke Smith
by Dyer Edmonds & Dyer
Att'ys.

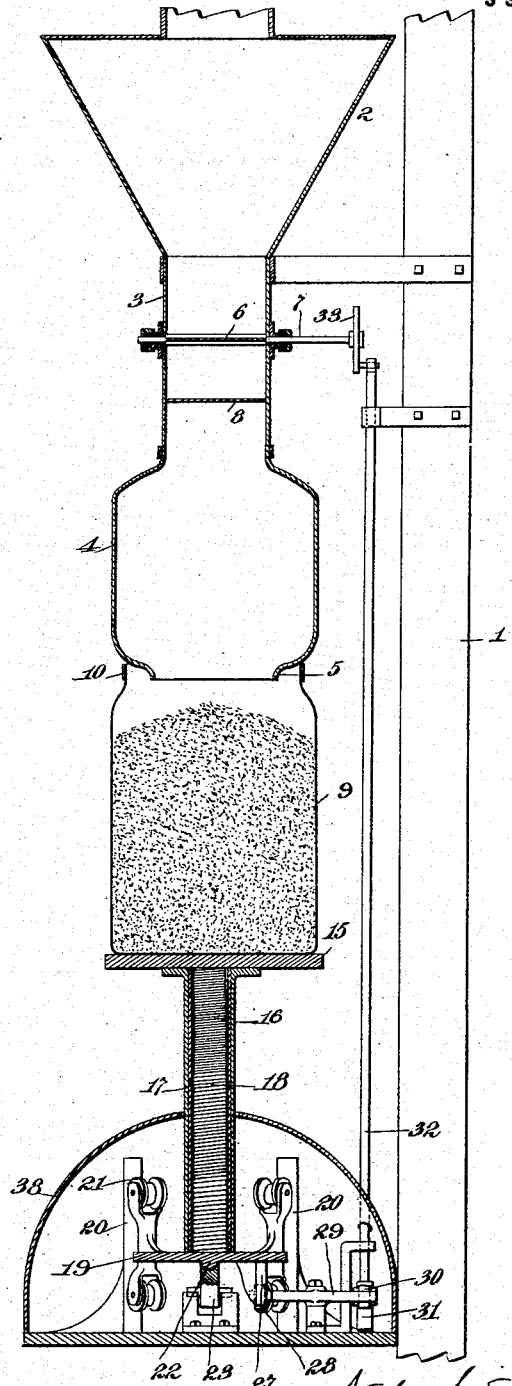

No. 676,100. Patented June 11, 1901.
A. & L. SMITH.
BAG FILLING AND WEIGHING MACHINE.
(Application filed June 28, 1900.)
(No Model.) 3 Sheets—Sheet 3.
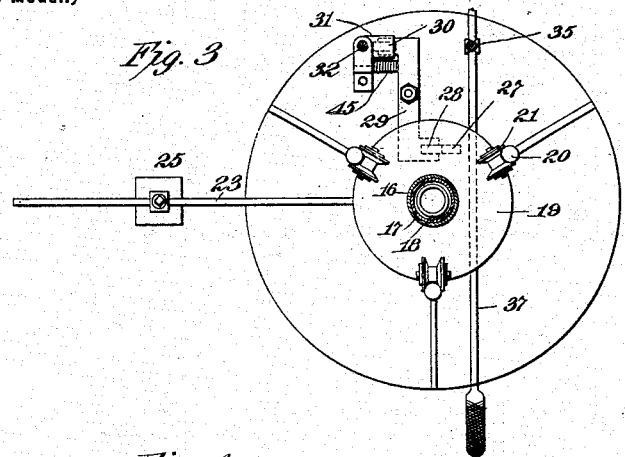
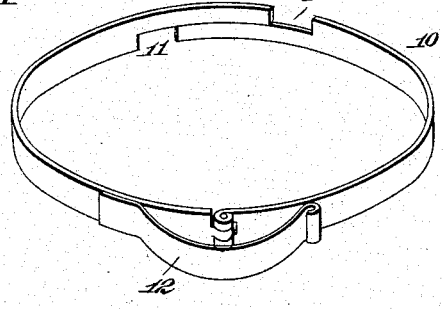
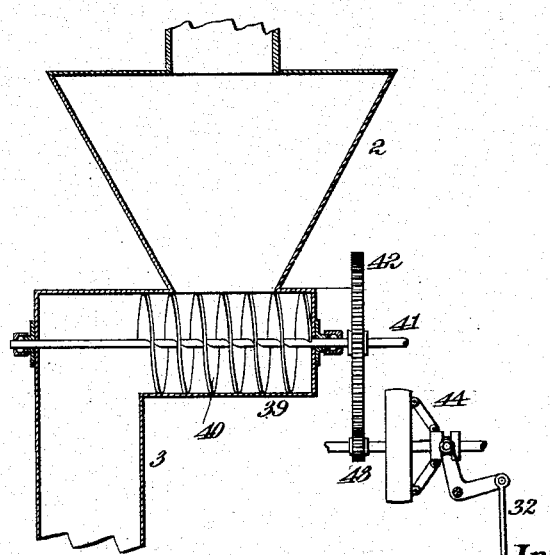
Witnesses: Inventors
Jas. F. Coleman Arthur Smith & Luke Smith
Jno. R. Taylor by Ayer Edmonds & Ayer
Att'ys.

UNITED STATES PATENT OFFICE.

ARTHUR SMITH AND LUKE SMITH, OF EASTON, PENNSYLVANIA.

BAG FILLING AND WEIGHING MACHINE.

SPECIFICATION forming part of Letters Patent No. 676,100, dated June 11, 1901.

Application filed June 28, 1900. Serial No. 21,925. (No model.)

*To all whom it may concern:*

Be it known that we, ARTHUR SMITH and LUKE SMITH, residing at Easton, county of Northampton, and State of Pennsylvania, have invented certain new and useful Improvements in Bag Filling and Weighing Machines, of which the following is a specification.

Our invention relates to an improved machine for automatically filling bags with a predetermined quantity of material from a supply in bulk; and our invention is adapted for the filling in bags and weighing of any dry material finely or otherwise divided which it may be desired to transport in bags or analogous packages in definite quantities.

Our invention is particularly adapted for use in connection with cement or other extremely finely divided product from which dust will be evolved in handling, since with our device the evolution of dust externally of the apparatus is entirely prevented.

Our object is to provide a machine which is of simple construction and wherein the automatic filling of bags with material can be carried on with great facility, while at the same time the accurate weighing of the material introduced into each bag will be effected.

In carrying our invention into effect we employ a generally cylindrical body having an external diameter approximately equal to that of the bag which is to be filled and having a tapered or reduced lower portion, the material to be filled and weighed being supplied to the cylindrical body past a suitable valve or cut-off device, the bags to be filled being frictionally secured in place over the cylindrical body by means of a spring clamping-ring and the bag resting at its bottom on a platform which engages with a suitable weighing apparatus, which weighing apparatus is connected to the valve or cut-off device, whereby the material entering the bag will cause the same to descend relatively to the cylindrical body until the weighing device is actuated to operate the cut-off, and thereby interrupt the flow of material into the bag. By making the cylindrical body with a tapered or reduced lower portion and by properly proportioning the length of the bag to the other parts of the apparatus the spring clamping-ring which holds the bag in place upon the cylindrical body will arrive opposite to the tapered or reduced portion thereof at the time that the weighing device comes into play, so that the latter can operate without error, which would not be the case if the effect of the friction of the clamping-ring were imposed upon the weighing device. In carrying our invention further into effect we interpose between the weighing device and the table on which the bag is carried or with which the bag coöperates a spring or springs of sufficient tension to assist in the proper supporting of the bag during the filling thereof, but not of sufficient tension as to result in the operation of the weighing device, whereby the bag after it has been introduced in place over the cylindrical body will be held with its bottom in contact with the lower end of said body, so that the material will be deposited more uniformly in the bag, will be packed more closely, and less dust will be generated than if the bag were suspended at all times directly below a discharge-mouth from which the material passed into the bag to fill the latter from the bottom up.

The invention relates to other details of construction, all of which will be more fully hereinafter described and claimed.

In order that the invention may be better understood, attention is directed to the accompanying drawings, forming a part of this specification, and in which—

Figure 1 is a vertical sectional view of the apparatus, showing a partly-filled bag in position thereon; Fig. 2, a vertical section on the line 2 2 of Fig. 1, showing the bag entirely filled and the weighing device as being operated; Fig. 3, a horizontal section on the line 3 3 of Fig. 1 looking downwardly; Fig. 4, a detail view illustrating the clamping-ring, and Fig. 5 a detail sectional view illustrating a modification of the cut-off mechanism.

In all of the above views corresponding parts are represented by the same numerals of reference.

1 represents a vertical pillar or post which may carry the parts of our improved device, but which may be replaced by any other desirable and convenient support, frame, or standard for carrying or sustaining the same.

2 represents a hopper which is supplied with the material in any suitable way, but preferably by means of a closed conduit, so as to overcome the evolution of dust, and 3 is a passage connecting said hopper with the cylindrical body 4 of the apparatus, said body having an open-mouthed tapered or reduced neck 5 at its bottom. In the passage 3 we mount a cut-off device of any suitable character, in the present instance comprising a flap or valve 6, carried on a central shaft 7 and normally occupying the position shown in full lines in Fig. 1. The flap or valve being centrally pivoted is obviously balanced, so that it can be opened and closed with a minimum pressure. In order to improve the accuracy of the valve, or, in other words, to reduce the leakage of material past the same during the closing operation, we may in some instances find it desirable to employ a pivoted flap 8, mounted in the passage 3 below the valve 6 and connected to the latter by a flexible connection, as shown, whereby the closing of the valve 6 will result in the simultaneous elevation of the flap 8 to receive a part at least of material which may have flowed past the valve 6 during the closing thereof.

The bag 9, which is to be filled, is of any suitable character, made either of paper or a textile fabric and having a diameter approximately equal to that of the body 4, but of course never less than that of said body. The upper end of the bag is frictionally held in place upon the body by means of a clamping-ring 10, the ends of which are cut away at 11 11, as shown in Fig. 4, whereby when the clamping-ring descends to a position coincident with the tapered or reduced neck 5 of the body the sections of said ring will abut together, so as to thereby limit the further contraction of said ring and preventing the latter from closing the mouth of the bag tightly upon the said neck. The clamping-ring may be made of one piece; but it preferably is made of two pieces, as shown in Fig. 4, elastically forced together by means of a spring 12. In order to limit the downward movement of the clamping-ring, we connect the same by means of chains 13 to stationary arms 14, which chains permit the clamping-ring to descend to a point almost in line with the bottom of the tapered neck 5.

In order to properly support the bag and to normally force the bottom of the latter in contact with the open mouth of the neck 5, we employ a table 15, from the bottom of which projects a tube 16, telescoping over a tube 17. Within the tubes 16 and 17 are a plurality of springs 18, preferably of different tension, as shown, whereby as the table 15 descends it will encounter a gradually-increasing resistance, to thereby secure a more uniform return of the table than if a single powerful spring were employed. The tube 17 is connected at its lower end to a platform 19, which takes a vertical movement between the standards 20, as shown, the platform being provided with antifriction-rollers 21, engaging said standards. A cam or projection 22 on the bottom of the platform 19 engages with the end of a scale-beam 23, pivoted on knife-edges and provided with the usual adjusting-weight 25, which coöperates with the scale 26, forming an ordinary weighing device. On the bottom of the platform 19 is a cam 27, which coöperates with a roller 28 on the end of a horizontal lever 29, the other end of said lever being provided with a roller 30, with which coöperates an inclined cam 31 on a rod 32, suitably guided, as shown, so as to be capable of vertical movement. The upper end of the rod 32 connects with one end of a lever 33, connected to the shaft 7 of the flap or valve 6, whereby when the roller 30 is removed from the path of the cam 31 the rod 32 may descend by its weight to close the flap or valve 6. If desired, the weight of the rod 32 may be supplemented by a suitable spring for more rapidly effecting this movement. The lever 33 is continued, as shown, on the other side of the shaft, and coöperating with this extension is a stud 34 on a restoring-rod 35, normally impelled upward by a spring 36 and connected at its lower end to a foot-lever 37, which is arranged convenient to the floor, so as to be readily operated. A cover or casing 38 incloses the weighing apparatus, as shown, except the end of the scale-beam 23, which extends through a slot in said casing, with the scale 26 on the outside of the casing, so that the weight 25 may be readily adjusted, and the shaft 7 is preferably suitably packed, by reason of which expedients the more delicate parts of the device will be protected from dust, while the escape of dust around the shaft 7 will be avoided.

Instead of a cut-off of the ordinary flap or valve character, as shown, any other convenient device for accomplishing the desired end may be employed—as, for instance, the modification shown in Fig. 5. With this modification the hopper 2 is formed at its lower end with a horizontal chamber 39, which connects with the passage 3, leading to the cylindrical body 4. Mounted in the chamber 39 is a screw or conveyer 40, carried on a shaft 41 and serving to feed material from the hopper 2 into the passage 3, as will be understood. The shaft 41 is driven in any suitable way—as, for instance, through the spur-gear 42 and pinion 43, the shaft of the pinion being provided with a clutch 44, which is operated by the movement of the cut-off rod 32, whereby the descent of the cut-off rod when released will result in the disengagement of the clutch 44 and the stopping of the feed device.

Having reference particularly to Figs. 1 to 4, inclusive, the operation of the device illustrated therein is as follows: Material being properly supplied to the hopper 2, the bag 9 is inserted over the body 4 and is clamped frictionally to the body, as shown, by means of the elastic clamping-ring 10. The springs 18 by reason of their tension maintain the table 15 in its uppermost position, forcing the bottom of the bag into engagement with the bottom of the neck 5 of the body. During these operations it will be understood that the cut-off device will be closed, the cut-off rod 32 being in its lowermost position. By now depressing the foot-lever 37 the restoring-rod 35 opens the valve 6 and elevates the cut-off rod 32, so as to move the cam 31 above the antifriction-roller 30, the tension of the spring 45 (shown in Fig. 3) resisting the movement of the lever 29. As the material accumulates in the bag the latter tends to descend, forcing the table 15 downward against the tension of the springs 18, but not operating the weighing device. When the slack in the bag below the cylindrical body has been taken up, the bag as a whole will move downward relatively to the body, the clamping-ring 10 descending with the bag and holding the same in close engagement with the exterior walls of the body, so as to prevent the escape of dust past the same. When the bag has been almost completely filled, the clamping-ring 10 will have moved down opposite the reduced or tapered neck 5, so that the frictional retardation theretofore experienced will be removed. When the clamping-ring 10 has moved to its extreme lowermost position, the tube 16 will engage, preferably, the top of the platform 19, so that the weight of the bag will be imposed directly upon the weighing device, and when sufficient additional material has been added to the bag to operate the scale-beam 23 the slight descent of the platform will cause the cam 27 to move the releasing-lever 29, to thereby release the cut-off rod 32 and to permit the cut-off devices to operate to cut off the supply of material to the bag. The bag is then suitably tied and removed from the machine, a new bag is inserted in place, and the operations explained are repeated. With the modification of device shown in Fig. 5 the same operation takes place, except that the operation of the foot-lever 37 results in the engagement of the clutch 44 to start the cut-off device, while the operation of the cut-off rod 32 results in the disengagement of the clutch to stop the cut-off device.

Having now described our invention, what we claim as new, and desire to secure by Letters Patent, is as follows:

1. In a bag filling and weighing machine, the combination with a cylindrical body having a tapered or reduced neck, a spring clamping-ring for frictionally holding a bag in place upon the body, said ring being freely movable longitudinally with respect to, and off of, the body, and a cut-off device for permitting the flow of material to be cut off from the body, substantially as set forth.

2. In a bag filling and weighing machine, the combination with a cylindrical body having a tapered or reduced neck, a spring clamping-ring for frictionally holding a bag in place upon the body, said ring being freely movable longitudinally with respect to, and off of, the body, a cut-off device for permitting the flow of material to be cut off from the body, and an elastically-impelled table mounted below the body, and with which the bag coöperates, substantially as set forth.

3. In a bag filling and weighing machine, the combination with a cylindrical body having a tapered or reduced neck, a spring clamping-ring for frictionally holding a bag in place upon the body, said ring being freely movable longitudinally with respect to, and off of, the body, a cut-off device for permitting the flow of material to be cut off from the body, a vertically-movable table mounted below the body and with which the bag coöperates, a weighing device connected to the table for weighing the bag and its contents thereon, and connections between the weighing device and the cut-off device, substantially as set forth.

4. In a bag filling and weighing machine, the combination with a cylindrical body having a tapered or reduced neck, a spring clamping-ring for frictionally holding a bag in place upon the body, said ring being freely movable longitudinally with respect to, and off of, the body, a cut-off device for permitting the flow of material to be cut off from the body, a vertically-movable table mounted below the body and with which the bag coöperates, and elastically connected to the weighing device, and connections between the weighing device and the cut-off device, substantially as set forth.

5. In a bag filling and weighing machine, the combination with a cylindrical body having a tapered or reduced neck, a spring clamping-ring for frictionally holding a bag in place upon the body, said ring being freely movable longitudinally with respect to, and off of, the body, a cut-off device for permitting the flow of material to be cut off from the body, a vertically-movable table mounted below the body and with which the bag coöperates, and elastically connected to the weighing device by means of a plurality of springs of varying tension, and connections between the weighing device and the cut-off device, substantially as set forth.

6. In a bag filling and weighing machine, the combination of a cylindrical body having a tapered or reduced lower neck, a cut-off mechanism for admitting material to and cutting it off from said body, a clamping-ring surrounding the body for holding a bag frictionally in engagement therewith, and flexible connections with the clamping-ring for limiting the downward movement thereof, as and for the purposes set forth.

7. In a bag filling and weighing machine, the combination of a cylindrical body having a tapered or reduced lower neck, a cut-off mechanism for admitting material to and cutting it off from said body, a clamping-ring surrounding the body for holding a bag frictionally in engagement therewith, flexible connections with the clamping-ring for limiting the downward movement thereof, a vertically-movable table below the body with which the bag coöperates, a weighing device connected to the table, and connections between the weighing device and the cut-off device, substantially as set forth.

8. In a bag filling and weighing machine, the combination with a table for carrying the bag which is being filled, a cut-off device for cutting off the supply of material entering the bag, a weighing device, connections between the weighing device and the cut-off mechanism, telescoping tubes between the table and the weighing device, and a spring in said tubes, substantially as set forth.

9. In a bag filling and weighing machine, the combination with a table on which the bag is being carried and a cut-off mechanism for permitting the supply of material to the bag to be cut off, of a platform connected to said table, a scale-beam borne upon at one end by said platform and carrying a weight at the other end, a cut-off rod connected with the cut-off mechanism, a releasing-lever for locking the cut-off rod in one position, a cam on the table for actuating said releasing-lever to permit the release of the cut-off rod, and a restoring-lever for restoring the cut-off rod to its normal position, substantially as set forth.

10. In a bag filling and weighing machine, the combination with a table on which the bag is carried and a cut-off mechanism for permitting the supply of the material to the bag to be cut off, of a platform connected to said table, a scale-beam borne upon at one end by said platform and carrying a weight at the other end, a cut-off rod connected with the cut-off mechanism, a releasing-lever for locking the cut-off rod in one position, a cam on the table for actuating said releasing-lever to permit the release of the cut-off rod, and a roller at each end of said releasing-lever coöperating respectively with said cam and with the lower end of the cut-off rod, substantially as set forth.

This specification signed and witnessed this 23d day of June, 1900.

ARTHUR SMITH.
     LUKE SMITH.

Witnesses:
 GEO. H. MUTCHLER,
 JAS. J. DOYLE.